United States Patent [19]

Machida et al.

[11] 3,956,767

[45] May 11, 1976

[54] SIGNAL RECORDING AND/OR REPRODUCING APPARATUS WITH PHASE SHIFTING TO REDUCE SIGNAL AMPLITUDE AT OVERLAP POINTS

[75] Inventors: Keisuke Machida, Yokohama; Katsuichi Tachi, Kanagawa, both of Japan

[73] Assignee: Sony Corporation, Tokyo, Japan

[22] Filed: Dec. 5, 1974

[21] Appl. No.: 530,002

[30] Foreign Application Priority Data

Dec. 8, 1973 Japan .............................. 48-139745

[52] U.S. Cl. .................................... 360/22; 360/61; 360/64

[51] Int. Cl.² .................... G11B 15/14; G11B 15/12

[58] Field of Search .................. 178/6.6 HS; 360/64, 360/22, 87, 82, 63, 61, 23, 8, 9

[56] References Cited

UNITED STATES PATENTS 2,944,113 7/1960 Wehde .................................. 360/22

3,359,375 12/1967 Hannan.................................. 360/64

*Primary Examiner*—Bernard Konick
*Assistant Examiner*—Alan Faber
*Attorney, Agent, or Firm*—Lewis H. Eslinger; Alvin Sinderbrand

[57] ABSTRACT

A signal recording and/or reproducing apparatus having a plurality of signal recording means for successively recording an input signal on a recording medium and/or a plurality of signal reproducing means for successively reproducing a recorded signal from the recording medium, and a plurality of signal recording and/or reproducing circuits adapted to correspond to the respective signal recording and/or reproducing means; is further provided with one or more phase shifters for phase-shifting by 120° relative to each other the signals which are successively recorded or reproduced so as to avoid any increase in level in the reproduced signals during overlap periods when the signal recording or reproducing means are simultaneously operative.

10 Claims, 9 Drawing Figures

Fig-2A
Fig-2B
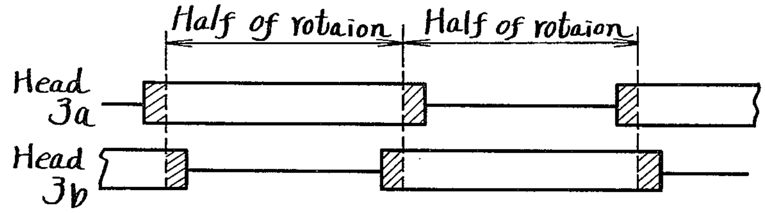
Fig-3
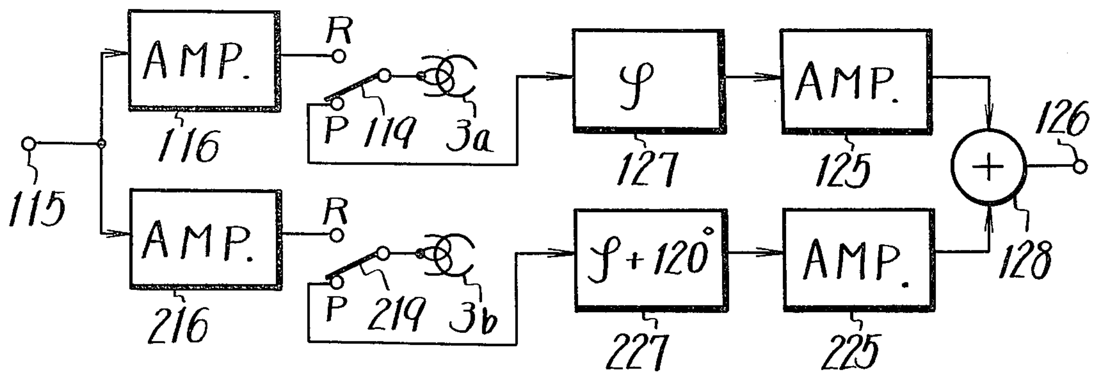
Fig-4
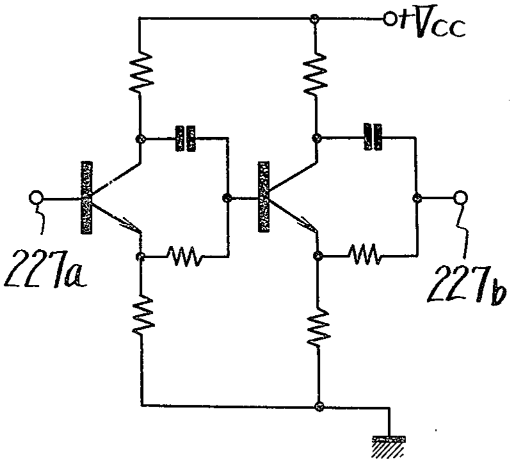
Fig-5
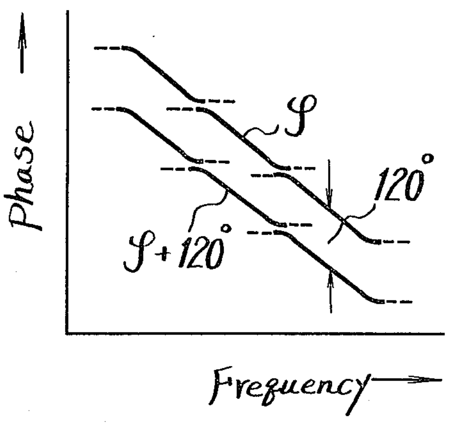

SIGNAL RECORDING AND/OR REPRODUCING APPARATUS WITH PHASE SHIFTING TO REDUCE SIGNAL AMPLITUDE AT OVERLAP POINTS

BACKGROUND OF THE INVENTION

1. Field of the Invention

This invention relates generally to a signal recording and/or reproducing apparatus and, more particularly, to such an apparatus employing plural signal transducers, such as, magnetic heads, which are selectively rendered operative to record and/or reproduce a signal.

2. Description of the Prior Art

A magnetic recording and/or reproducing apparatus employing a plurality of magnetic heads finds ready application in a video tape recording (VTR) apparatus. Generally, such a recording and/or reproducing apparatus is provided with a guide drum and a plurality of rotary magnetic heads disposed about the periphery of the guide drum. A magnetic recording medium is wound or otherwise deployed about at least a portion of the surface of the guide drum to permit the rotary magnetic heads to scan such a recording medium. If the magnetic recording medium is a conventional magnetic tape, the rotary magnetic heads scan successive parallel lines which are skewed with respect to the length of the tape. Depending upon the mode of operation, the rotary heads serve to record signals on or reproduce signals from the scanned parallel tracks. If the magnetic recording medium is a magnetic sheet, the rotary heads function to scan parallel tracks across the surface of such a sheet. Relative motion is imparted in an axial direction between the magnetic sheet and the rotary heads such that a multiple of parallel signal tracks are provided. Generally, the rotary heads are spaced such that when one rotates out of recording (or reproducing) relationship another head simultaneously rotates into such recording (or reproducing) relationship. In accordance with one example of the typical prior art apparatus, one rotary head leaves the sheet just as another moves into contact therewith. Clearly, signals supplied to both of such rotary heads might be recorded simultaneously by the departing and entering heads. Such a signal overlap can result in undesired and deleterious affects and is usually avoided by providing a switching circuit which determines the appropriate rotary head to be supplied with a signal for recording or reproducing. That is, the signal supplied to the departing rotary head will be switched over to the entering rotary head at the proper time so as to eliminate the signal overlap.

If the signal supplied to the rotary heads for recording (or reproducing) includes a periodic interval during which no information is present, such as the blanking interval of a television signal, the switching circuit is synchronously operated to effect the chang-over during such blanking interval so as to avoid switching noise which might otherwise be present. However, if the signal to be recorded does not include such a periodic blanking interval, or if such signal is provided with an irregular or random blanking interval, the synchronous operation of the switching circuit will not provide change-over during periods of no information. For example, if an audio signal is to be recorded by the aforenoted magnetic recording and/or reproducing apparatus, the absence of a periodic blanking interval in the audio signal prevents the timed operation of the switching circuit during periods of no information. Consequently, the inherent switching noise associated with such change-over switching operation will be present. This is an attendant disadvantage of the prior art magnetic recording apparatus.

OBJECTS OF THE INVENTION

Therefore, it is an object of the present invention to provide an improved signal recording and/or reproducing apparatus.

It is another object of the present invention to provide an improved magnetic recording and/or reproducing apparatus wherein a plurality of magnetic heads are used to record and/or reproduce a signal on a recording medium.

It is a further object of the present invention to provide a magnetic recording apparatus having a plurality of magnetic heads for recording an input signal on a recording medium and wherein the input signal is phase-shifted between recording heads without attendant switching and amplitude noises.

A still further object of this invention is to provide a signal reproducing apparatus having a plurality of magnetic heads wherein the output signals of such heads are phase-shifted relative to each other without attendant switching and amplitude noises.

Yet another object of this invention is to provide a magnetic recording and/or reproducing apparatus having a plurality of magnetic heads which are selectively controlled to have a sufficient recording level or reproducing level so that an input signal can be recorded on a recording medium thereby and wherein the plural heads are controlled in a selective manner to avoid the deleterious effects of signal recording and/or reproducing overlap without requiring the use of a switching circuit.

The above, and various other objects and advantages of the present invention, will become clear from the ensuing detailed description of certain preferred embodiments thereof, and the novel features will be particularly pointed out in the appended claims.

SUMMARY OF THE INVENTION

In accordance with the present invention, a magnetic recording and/or reproducing apparatus is provided with a plurality of magnetic recording and/or reproducing heads for successively recording an input signal on a recording medium and for successively reproducing the recorded signals on such recording medium.

The plurality of magnetic heads are secured to a rotary disc and approximately equally spaced apart from each other.

A signal recording circuit is provided for supplying an input signal to the plurality of magnetic heads so that the latter will successively record such signal on a sheet medium, and furthermore a signal reproducing circuit is provided for reproducing the signals recorded on the sheet medium and supplying the reproduced signals to an output terminal of the apparatus. In the recording or reproducing circuit, a phase shifter circuit is provided by which the signals to be supplied to, or obtained from the plurality of magnetic heads are phase-shifted relative to each other.

BRIEF DESCRIPTION OF THE DRAWINGS

The following detailed description will be best understood in conjunction with the accompanying drawings in which:

FIGS. 2A and 2B are diagrams of audio signals used for explaining the apparatus shown in FIG. 1;

FIG. 3 is a schematic diagram representing one of the preferred embodiments of the present invention;

FIG. 4 is a detailed circuit diagram of a phase shifter used in the embodiment shown in FIG. 3;

FIG. 5 is a graph showing the phase shifting characteristics of the circuit shown in FIG. 4;

DETAILED DESCRIPTION OF CERTAIN ONES OF THE PREFERRED EMBODIMENT

Figure 1:
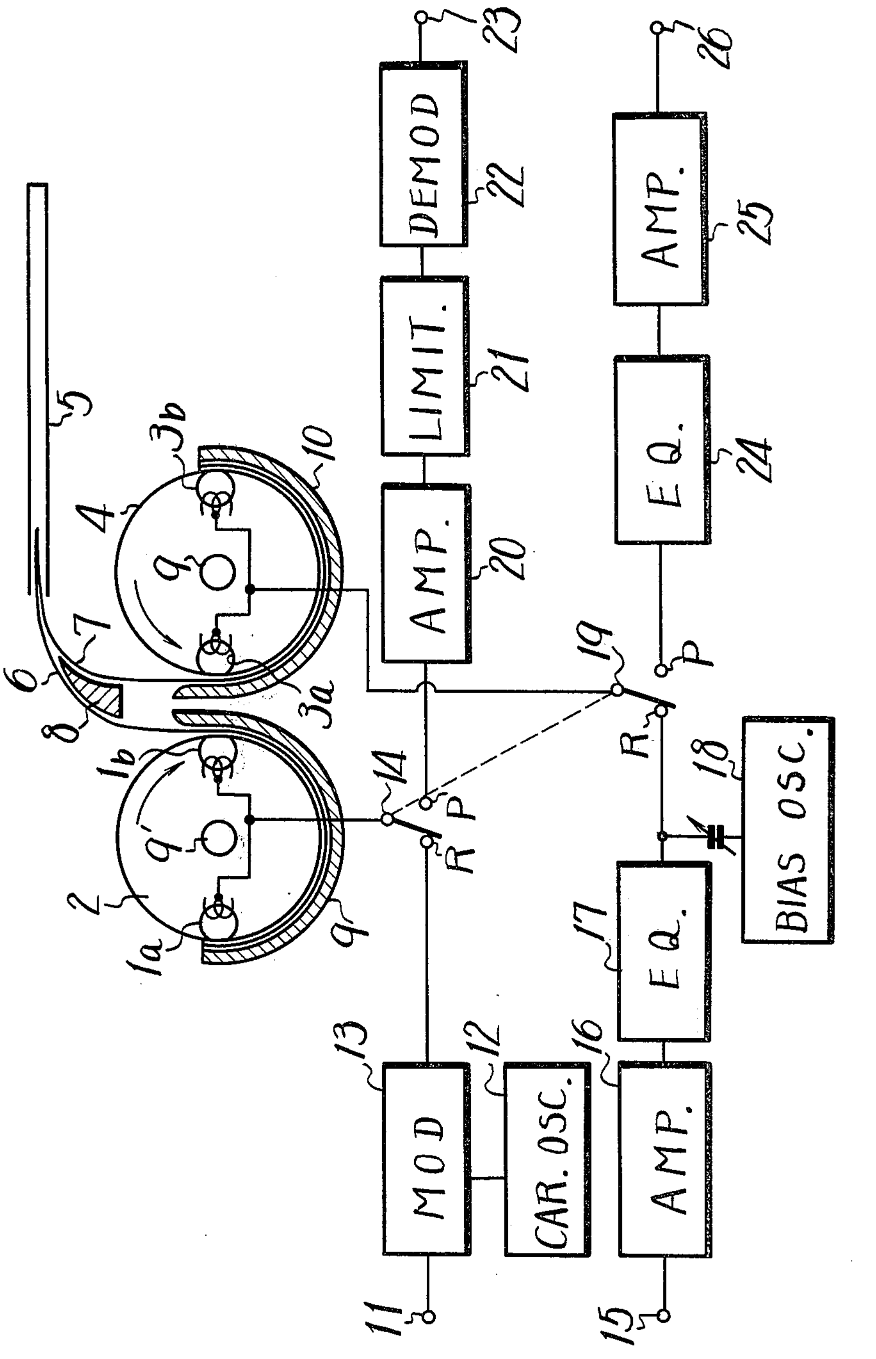
FIG. 1 is a block diagram representing a prior art magnetic recording and/or reproducing apparatus.

Referring to the drawings in detail and, in particular, to FIG. 1, a magnetic recording and/or reproducing apparatus of the prior art, which finds ready application in recording and reproducing video signals such as television signals, is shown to be comprised of first and second signal recording and/or reproducing devices. The first recording and/or reproducing device is comprised of a pair of rotary magnetic heads 1*a*, 1*b*, a rotary disc 2 and a guide member 9. The rotary heads 1*a*, 1*b* are adapted to record and/or reproduce a video signal supplied thereto. These heads 1*a*, 1*b* are secured to the rotary disc 2 and are spaced apart from each other by approximately 180°. As illustrated, the heads 1*a*, 1*b* are disposed at the periphery of the disc 2.

The second magnetic recording and/or reproducing device is comprised of a pair of rotary magnetic heads 3*a*, 3*b*, a rotary disc 4 and a guide member 10. The first and second recording and/or reproducing devices are similar and therefore the heads 3*a*, 3*b*, which are adapted to record and/or reproduce a signal are secured to the periphery of the rotary disc 4 and are spaced apart from each other by approximately 180°. For the application wherein the illustrated recording and/or reproducing devices are used to record and/or reproduce television signals, the magnetic heads 3*a*, 3*b* may be adapted to record and/or reproduce an audio signal. As a numerical example, the heads 1*a*, 1*b*, and thus the disc 2, are rotated at the rate of 30 r.p.s. and the heads 3*a*, 3*b*, and thus the disc 4, are rotated at the rate of 5 r.p.s., the discs 2 and 4, and hence the respective heads, being rotated in opposed directions as represented by the arrows.

The rotary heads 1*a*, 1*b*, as well as the heads 3*a*, 3*b* are adapted to record signals on and/or reproduce signals from magnetic media, such as respective magnetic sheets 6 and 7. As diagrammatically represented in FIG. 1, the pair of magnetic sheets 6 and 7 may be contained in a suitable envelope 5 therefor. Although not shown herein, it should be appreciated that an appropriate apparatus is provided to withdraw the magnetic sheets from the envelope 5 and to separate the sheets 6 and 7 from each other. A separating member 8 is illustrated to more clearly represent the function performed by such separating apparatus. Once separated, the sheets 6 and 7 are guided by respective guide members 9 and 10 so as to be wound about at least portions of the discs 2 and 4, respectively. Preferably, each sheet is deployed about a segment of each disc equal to approximately 180°. Each sheet, as thus wound, defines a portion of a cylindrical surface. A more detailed description of the magnetic recording sheets, the envelope therfor and the sheet separating and driving apparatus for deploying the sheets about the illustrated discs is found in copending U.S. Pat. Application Ser. No. 500,176 filed on Aug. 23, 1974 by Nobutoshi Kihara, entitled "Video Recording and/or Reproducing Apparatus" and having the same assignee as the present invention.

As noted hereinabove, in one application of the illustrated apparatus, video signals are recorded on the magnetic sheet 6 and audio signals are recorded on the magnetic sheet 7. The video signal processing circuit is comprised of a modulator 13 and an oscillator 12. A video signal input terminal 11 is connected to a first input of the modulator 13 and the oscillator 12 is connected to a second input of the modulator 13. As one example, the modulator 13 may be a phase modulator wherein the video signal phase-modulates a carrier signal supplied to the modulator 13 by the oscillator 12. The resultant phase-modulated signal produced by the modulator 13 is supplied to the rotary magnetic heads 1*a*, 1*b* by a switch 14. This switch 14 includes a first fixed contact R, a second fixed contact P and a movable contact adapted to selectively engage one of the fixed contacts R and P. When a recording operation is desired, the movable contact engages the fixed contact R to thus supply the phase-modulated video signal to the magnetic heads 1*a*, 1*b*, respectively. When a signal reproducing operation is desired, the switch 14 is actuated so that the movable contact engages the fixed contact P. In this latter position, the recorded signals picked up by the rotary heads 1*a*, 1*b* are supplied to the signal reproducing circuit which is described below.

The rotary heads 3*a*, 3*b*, are adapted to be selectively coupled to audio signal processing circuits for the recording and/or reproducing operations. The audio signal processing circuit for recording is comprised of an amplifier 16, an equalizer 17 and a bias oscillator 18. The amplifier 16 is connected to an audio signal input terminal 15. The output of the amplifier 16 is coupled through the equalizer 17 to a switch 19. As will be described further hereinbelow, the bias oscillator 18 is adapted to supply a bias current to the rotary heads 3*a*, 3*b* through a variable capacitive impedance. The switch 19 serves to selectively connect the rotary heads 3*b*, 3*a* to the equalizer 17 and to an audio signal reproducing apparatus. The switch 19 is similar to the aforedescribed switch 14 and includes a first fixed contact R, a second fixed contact P and a movable contact adapted to selectively engage one of the fixed contacts R and P. When in the signal recording mode, the movable contact of switch 19 engages the fixed contact R whereby the audio signal supplied through the amplifier 16 and the equalizer 17 is applied to the rotary heads 3*a*, 3*b*, respectively. In the signal reproducing mode, the switch 19 is operated so that the movable contact engages the fixed contact P, whereby the signals picked up by the rotary heads 3*a*, 3*b* are supplied to the audio signal reproducing circuit. As is illustrated, the switches 14 and 19 are ganged for simultaneous operation. Thus, as the discs 2 and 4 are rotated about their respective axes *g' and g*, the video signal magnetic heads 1*a*, 1*b* and the audio signal magnetic heads 3*a*, 3*b* are driven in the illustrated directions. During a signal recording operation, the phase-modulated video signal is supplied through the switch 14 to the rotary heads 1*a*, 1*b* to be recorded in parallel recording tracks on the magnetic sheet 6. Simultaneously, the audio signal supplied through the amplifier 16 and the equalizer 17 is supplied through the switch 19 to the rotary heads *3a*, *3b* so as to be recorded in parallel tracks on the magnetic sheet 7. Additionally, the bias current generated by the oscillator 18 and superimposed on the audio signal is supplied to the rotary heads *3a*, *3b*.

During signal reproduction, the switches 14 and 19 are operated so that their movable contacts engage the respective fixed contacts, respectively. In this configuration, the video signals previously recorded on the magnetic sheet 6 are picked up by the rotary heads 1*a*, 1*b* and supplied through the switch 14 to the video signal reproducing circuit. Simultaneously, the audio signals previously recorded on the magnetic sheet 7 are picked up by the rotary heads *3a*, *3b* and supplied through the switch 19 to the audio signal reproducing circuit. As illustrated, the video signal reproducing circuit is comprised of an amplifier 20, a limiter 21 and a demodulator 22, all connected in series to the fixed contact P of the switch 14. The output of the demodulator 22 is supplied to a video signal output terminal 23. It is appreciated that the demodulator 22 operates to recover the video signal that previously had been phase-modulated by the modulator 13. Accordingly, the demodulator 22 can comprise a phase-modulator.

The audio signal reproducing circuit is comprised of an equalizer 24 and an amplifier 25, connected in series to the fixed contact P of the switch 19. The output of the amplifier 25 is supplied to an audio signal output terminal 26. Accordingly, in the reproducing mode, the audio signals that previously had been recorded on the magnetic sheet 7 are picked up by the rotary heads *3a*, *3b* and supplied through the switch 19 to the equalizer 24 and the amplifier 25, and thence to the audio signal output terminal 26.

As previously noted, a video signal is usually provided with a blanking interval during which no picture information is present. Accordingly, the video signal supplied to the rotary heads 1*a*, 1*b* can be switched therebetween by conventional change-over switching apparatus which is operated during the blanking interval times without attendant switching noise. That is, the video signal is supplied to one of the rotary heads 1*a*, 1*b* while it is in contact with, or scanning, the magnetic sheet 6. When such rotary head 1*a* or 1*b* departs from the magnetic sheet 6, the video signal is then switched to the other rotary head 1*b* or 1*a* which is now arriving at the magnetic sheet 6. Although this switching technique operates satisfactorily for the video signals, a similar technique is accompanied by undesired switching noise when used with audio signals. This obtains because the audio signal is not provided with a blanking interval or with a periodic interval during which no useful information is present. There is thus no convenient time period during which change-over switching apparatus can be operated to switch the audio signals from one rotary head to another.

In the case of the above apparatus, the magnetic sheet 7 for the audio signals is deployed along the rotary disc 4 about a little over 180° and hence each of the heads *3a*, *3b* scans the sheet 7 during more than half of a complete rotation thereof with the result that the audio signals are recorded on successive portions of the sheet in an overlapped state, as shown diagramatically on FIGS. 2A and 2B. Accordingly, upon reproduction if the signals reproduced by the heads *3a*, *3b* are composed, as they are, and delivered, to terminal 26 the level of the reproduced signals is undesirably doubled at the time when heads *3a* and *3b* simultaneously scan overlapped portions or tracks on the sheet.

The present invention serves to eliminate the defects mentioned above. One of the preferred embodiment according to the invention will be hereinbelow described with reference to FIGS. 3 to 8.

Generally, in accordance with the invention, the signals applied to or obtained from rotary heads, which may successively scan the recording medium with periods of overlap, are made to have a phase difference of 120° therebetween.

FIG. 3 shows a circuit which may operate to provide the phase difference of 120° between the signals obtained from the heads *3a*, *3b* upon reproduction. Upon recording, an audio signal applied to an input terminal 115 is supplied to the heads *3a*, *3b* through amplifiers 116, 216 and fixed contacts R of switches 119, 219, respectively, to record the signal on, for example, a magnetic sheet (not shown) in a manner similar to that mentioned above. Upon reproduction, the signals reproduced by the heads *3a*, *3b* are respectively applied through the other fixed contacts P of the switches 119, 219, phase shifters 127, 227 and amplifiers 125 and 225 to an adder 128. The adder 128 produces a composite signal which is delivered to an output terminal 126.

As shown in FIG. 4, by way of example, each of the phase shifters 127, 227 may be made of a suitable number of transistors each of which has a capacitor and a resistor between its collector and emitter. In this case, if the capacity of the capacitor and the resistance of the resistor are selected suitably, the phase shift effected by the phase shifter 127 is made to be $\phi$ while that of the phase shifter 227 is made $\phi + 120°$ so that the signals delivered to amplifiers 125 and 225 always have the phase difference of 120° within the band of the audio signal, as shown in FIG. 5. In FIG. 4, reference numerals 227*a* and 227*b* indicate input and output terminals of the phase shifter 227, respectively.

If the signals reproduced by the heads *3a*, *3b* are assumed to be sine waves with the same phase, and if the signals are equal in level, each of them can be expressed as follows.

$A \sin \omega t$

Accordingly, when the phase shifters 127 and 227 are not provided, the composite signal during each period in which signals are obtained from both the heads *3a*, *3b* can be expressed as follows.

$$2A \sin \omega t \qquad (1)$$

Thus, the level of the signal in each such period is doubled as compared with that in any other period.

On the contrary, in the reproducing circuit according to the invention, the phase shifters 127 and 227 are provided, so that, if the signals reproduced by the heads *3a*, *3b* are each again expressed as $A \sin \phi t$, the output signal from the phase shifter 127 can be expressed as:

$$A \sin (\omega t + \phi) \qquad (2)$$

while, the output signal from the phase shifter 227 can be expressed as:

$$A \sin (\omega t + \phi + 120°) \qquad (3)$$

As a result, the composite signal in each period in which both the heads *3a*, *3b* produce output signals becomes $$A \sin(\omega t + \phi) + A \sin(\omega t + \phi + 120^\circ) = A \sin(\omega t + \phi) + A [\sin(\omega t + \phi) \cos 120^\circ + \cos(\omega t + \phi) \sin 120^\circ]$$

$$= A [(1 - \tfrac{1}{2}) \sin(\omega t + \phi) + \quad (3/2) \cos(\omega t + \phi)]$$

$$= A \sin(\omega t + \phi + 60^\circ) \qquad 4$$

It will be, therefore, obvious from the expression (4) that the level of the composite signal in the period when signals are reproduced by both heads is the same as that in any other period. In this case, no noise appears at switching. Further, the period in which only one or the other of the heads 3*a*, 3*b* delivers an output signal to the output terminal 126 is phase-shifted by $\phi + 60^\circ$ from the period in which both the heads 3*a*, 3*b* produce output signals, but this phase shift causes no trouble.

Figure 6:
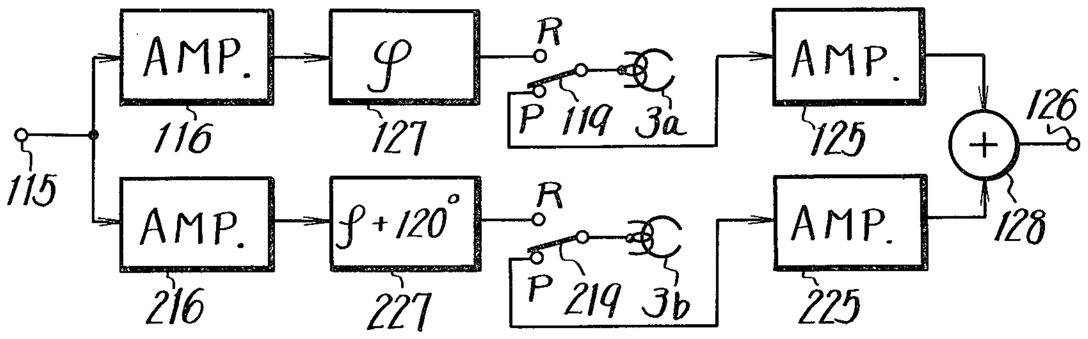
FIG. 6 is a schematic diagram showing an alternative embodiment of FIG. 3.

FIG. 6 shows an embodiment of the invention in which the phase shifters 127 and 227 are provided in the recording circuit rather than in the reproducing circuit to make the input signals have the phase difference of 120°. This embodiment achieves the same effect as the embodiment of FIG. 3.

Figure 7:
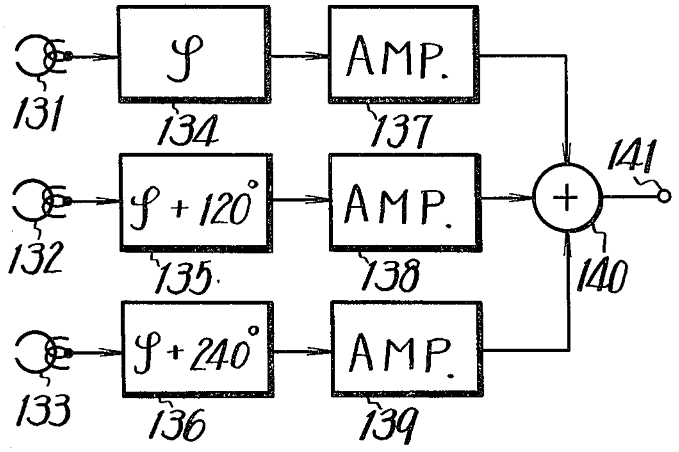
FIGS. 7 and 8 are schematic diagrams showing other embodiments in accordance with the present invention.

The invention can also be applied to the case where three or more rotary heads are used to record and/or reproduce an audio signal alternately in a successive manner. By way of example, as shown in FIG. 7, if three rotary heads 131, 132 and 133 successively scan a recording medium (not shown), the reproduced output signals from the heads 131, 132 and 133 are supplied through a phase shifter 134 of $\phi$, a phase shifter 135 of $\phi + 120^\circ$ and a phase shifter of 136 of $\phi + 240^\circ$ to amplifiers 137, 138 and 139, respectively and then to an adder 140 whose output signal is delivered to an output terminal 141.

Figure 8:
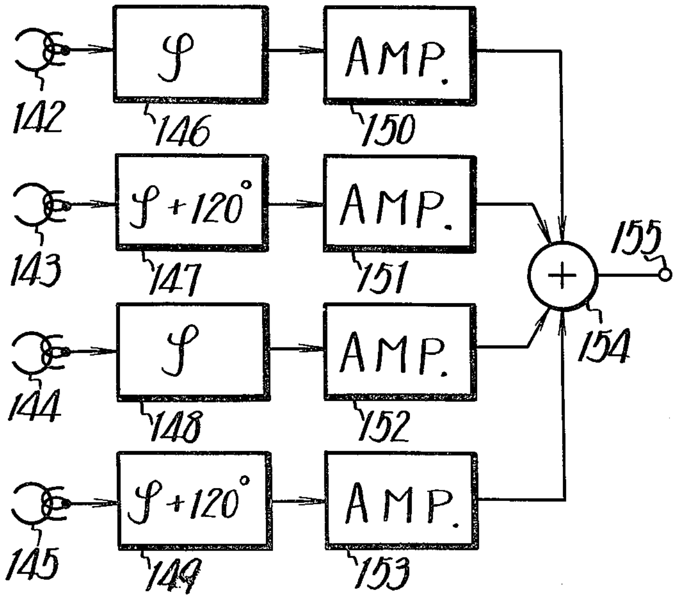

For the case where four rotary heads 142, 143, 144 and 145 successively scan a recording medium (not shown), as shown in FIG. 8, it is sufficient that, upon reproduction, reproduced output signals from the heads 142, 143, 144 and 145 are supplied through a phase shifter 146 of $\phi$, a phase shifter 147 of $\phi + 120^\circ$, a phase shifter 148 of $\phi$ and a phase shifter 149 of $\phi + 120^\circ$ and through amplifiers 150, 151, 152 and 153, respectively, to an adder 154 whose output signal is delivered to an output terminal 155. The reproduced audio signal obtained at the output terminal 141 or 155 is constant in level and with no noise caused by switching.

In all of the foregoing, the invention has been described as applied to the magnetic recording and reproducing of audio signals. However, in place of a magnetic record medium, the record medium may be constituted by a thin plastic foil in which grooves are formed with varying depths to constitute the record tracks having audio signals recorded therein, with such recorded signals being reproduced by a diamond or other stylus moving along the successive record tracks and associated with a piezo-electric ceramic transducer or the like by which the resulting variations in the pressure on the pickup stylus are converted to a corresponding electric signal. The invention can also be applied to the electro-optical recording and reproducing of audio signals, for example, in which the successive record tracks on the record medium have either variations in light reflectively or transmission corresponding to the recorded signals therein.

The invention can be further applied to a record medium constituted by a vinyl base sheet having a coating of aluminum or copper thereon and a dielectric coating, such as, of polystyrene, on the aluminum or copper coating, in which case the audio signals are recorded as variations in the capacitance along the successive record tracks. When reproducing such signals the variations in capacitance between the electrode of a pickup head moving along the record tracks in succession and the aluminum or copper coating of the record medium are employed to produce an output signal corresponding to the original recorded audio signals.

Although specific embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

We claim as our invention:

1. An apparatus for recording and reproducing a signal on a record medium, comprising a plurality of transducers successively scanning the record medium in a repeated cyclic order for respective scanning intervals which have overlapping periods; recording circuit means including an input terminal for receiving a signal to be recorded, and a plurality of channels extending from said input terminal and being operative, during a recording operation of the apparatus, to transmit the signal from said input terminal to said transducers, respectively, for sequential recording by said transducers on the record medium during said respective scanning intervals; reproducing circuit means including an output terminal for delivering a reproduced signal, a plurality of channels operative, during a reproducing operation of the apparatus, to transmit the signals reproduced sequentially by said transducers, respectively, from the record medium during said respective scanning intervals, and combining means for combining the sequentially reproduced signals transmitted by said channels of the reproducing circuit means to provide a combined reproduced signal at said output terminal; and phase-shifting means in one of said recording and reproducing circuit means for phase-shifting, by 120°, the signal transmitted through one of said channels of said one circuit means relative to the signal transmitted through at least another of said channels of said one circuit means, whereby to avoid level increases in said combined reproduced signal as a consequence of said overlapping periods of the scanning intervals.

2. An apparatus according to claim 1; in which said signal to be recorded is an audio signal.

3. An apparatus according to claim 1; in which said phase-shifting means are interposed in said channels of the recording circuit means so that the signal, as sequentially recorded on the record medium by said transducers, has its phase shifted by 120° for the successive scanning intervals.

4. An apparatus according to claim 1; in which said phase-shifting means are interposed in said channels of the reproducing circuit means so that the sequentially reproduced signals, as received by said combining means, have their phases shifted relative to each other by 120°.

5. An apparatus according to claim 1; in which said plurality of transducers consists of first and second transducers; and said phase-shifting means shifts the phase of the signal transmitted through the channel of said one circuit means corresponding to said second transducer by 120° relative to the phase of the signal transmitted through the channel of said one circuit means corresponding to said first transducer.

6. An apparatus according to claim 1; in which said plurality of transducers consists of first, second and third transducers; and in which said phase-shifting means shifts the phase of the signal transmitted through the channel of said one circuit means corresponding to said second transducer by 120° relative to the phase of the signal transmitted through the channel of said one circuit means corresponding to said first transducers, and said phase-shifting means further shifts the phase of the signal transmitted through the channel of said one circuit means corresponding to said third transducer.

7. An apparatus according to claim 1; in which said plurality of transducers consists of first, second, third and fourth transducers; and said phase-shifting means shifts the phase of the signal transmitted through the channels of said one circuit means corresponding to said second and fourth transducers, respectively, by 120° relative to the phase of the signal transmitted through the channels of said one circuit means corresponding to said first and third transducers, respectively.

8. An apparatus according to claim 1; in which the record medium is magnetically sensitive, and each of said transducers is a magnetic recording and reproducing head.

9. An apparatus for recording a signal on a record medium, comprising a plurality of transducers successively scanning the record medium in a repeated cyclic order for respective scanning intervals which have overlapped periods; recording circuit means including an input terminal for receiving a signal to be recorded, and a plurality of channels extending from said input terminal to transmit the signal from said terminal to said transducers, respectively, for sequential recording by said transducers on the record medium during said respective scanning intervals; and phase-shifting means included in said recording circuit means for phase-shifting, by 120°, the signal transmitted through one of said channels relative to the signal transmitted through at least another of said channels so that the signal, as recorded on the record medium during each of said scanning intervals, has its phase shifted by 120° relative to the phases of the signal as recorded during the next preceding and succeeding scanning intervals.

10. An apparatus for reproducing a signal recorded on a record medium, comprising a plurality of transducers successively scanning the record medium in a repeated cyclic order for respective scanning intervals which have overlapping periods; reproducing circuit means including an output terminal for delivering a reproduced signal, a plurality of channels operative to transmit the signals reproduced sequentially by said transducers, respectively, from the record medium during said respective scanning intervals, and combining means for combining the sequentially reproduced signals transmitted by said channels into a combined reproduced signal delivered to said output terminal; and phase-shifting means in said reproducing circuit means for phase-shifting, by 120°, the signal transmitted through one of said channels relative to the signal transmitted through at least another of said channels so that each portion of said combined reproduced signal corresponding to a respective one of said scanning intervals has its phase shifted by 120° relative to the phases of the portions of said combined reproduced signal corresponding to the next preceding and succeeding scanning intervals, whereby to avoid level increases in said combined reproduced signal as a consequence of said overlapping periods of the scanning intervals.

* * * * *